(12) United States Patent
Kramer

(10) Patent No.: US 7,730,852 B2
(45) Date of Patent: Jun. 8, 2010

(54) PORTABLE ANIMAL RESTRAINT AND FEEDING STATION

(76) Inventor: Robert H. Kramer, 416 2nd Ave. SE., Dyersville, IA (US) 52040

( * ) Notice: Subject to any disclaimer, the term of this patent is extended or adjusted under 35 U.S.C. 154(b) by 155 days.

(21) Appl. No.: 12/045,762

(22) Filed: Mar. 11, 2008

(65) Prior Publication Data

US 2009/0145371 A1 Jun. 11, 2009

Related U.S. Application Data

(60) Provisional application No. 60/938,791, filed on May 18, 2007.

(51) Int. Cl.
*A01K 5/00* (2006.01)
*A01K 3/00* (2006.01)
(52) U.S. Cl. ...................... 119/61.5; 119/787
(58) Field of Classification Search .............. 119/61.5, 119/786–794, 769
See application file for complete search history.

(56) References Cited

U.S. PATENT DOCUMENTS

| | | | |
|---|---|---|---|
| 227,675 A | 5/1880 | Carnes, Sr. | |
| 1,456,627 A | 5/1923 | Delbridge | |
| 2,087,176 A | 7/1937 | Webb | |
| 2,360,199 A | 10/1944 | Cawley | |
| 2,435,081 A * | 1/1948 | Howard | 119/786 |
| 2,484,263 A * | 10/1949 | Atkinson | 119/61.57 |
| 2,525,890 A * | 10/1950 | Gage | 119/787 |
| 2,790,419 A | 4/1957 | Sullivan | |
| 2,812,743 A * | 11/1957 | Dustin | 119/780 |
| 2,981,230 A | 4/1961 | Putnam | |
| 3,123,052 A * | 3/1964 | Marshall | 119/789 |
| D245,032 S * | 7/1977 | Hoffmann | D30/154 |
| 4,491,091 A * | 1/1985 | Satterfield | 119/780 |
| 4,546,730 A | 10/1985 | Holland | |
| 4,800,843 A * | 1/1989 | Wendling | 119/780 |
| 5,031,577 A | 7/1991 | Flugger | |
| 5,373,814 A | 12/1994 | Seymour | |
| 5,732,659 A | 3/1998 | Wiggins | |
| 5,957,092 A * | 9/1999 | Colsch | 119/787 |
| 6,401,656 B1 | 6/2002 | Adkisson | |
| 6,499,436 B1 | 12/2002 | Capperrune | |
| 6,523,500 B1 * | 2/2003 | Zenteno | 119/796 |
| 6,612,263 B2 | 9/2003 | Scheid et al. | |
| D505,757 S | 5/2005 | Wojcik et al. | |
| 7,234,417 B2 * | 6/2007 | Laird | 119/61.57 |
| 7,353,775 B1 * | 4/2008 | Stelmach | 119/61.54 |
| 2004/0216697 A1 | 11/2004 | Wojcik et al. | |

* cited by examiner

*Primary Examiner*—Rob Swiatek
*Assistant Examiner*—Kristen C Hayes
(74) *Attorney, Agent, or Firm*—James C. Nemmers; Shuttleworth & Ingersoll, PLC

(57) ABSTRACT

A portable and inexpensive device for restraining a dog, cat or other animal within a defined area. The device has a main body providing an endless circular groove that confines a wire or ring to rotating movement about the main body. The ring is attached to the animal's leash and allows the animal free movement within a circular area defined by the length of the leash. A plurality of removable pins anchor the device to the ground, with the pins being stored in storage grooves in the main body when not in use. The main body has a central recess that accommodates a bowl for food or water.

8 Claims, 6 Drawing Sheets

US 7,730,852 B2

PORTABLE ANIMAL RESTRAINT AND FEEDING STATION

This application claims priority under 35 USC 119 to Provisional Patent Application Ser. No. 60/938,791 filed on May 18, 2007, the contents of which are hereby incorporated by reference.

BACKGROUND OF THE INVENTION

1. Field of the Invention

This invention relates to the art of animal restraints and particularly to such restraints which are portable with a tangle-free tether that can be used outdoors and which also provide a feeding and watering bowl that cannot be easily overturned.

2. Description of the Prior Art

Carnes et al U.S. Pat. No. 227,675 discloses a stake that is driven into the ground, the stake having a rounded head with an annular recess that contains a ring freely rotatable in the recess. The ring has an eye to which the animal's tether is attached.

Webb U.S. Pat. No. 2,087,176 shows a tethering stake similar to Carnes et al but having a dome shaped guard between the tethering ring and the ground.

Cawley U.S. Pat. No. 2,360,199 discloses a tethering post driveable into the ground and having a cylindrical-shaped guard mounted on the post and rotatable around the post. The guard has an opening through which the tether extends, one end of the tether being attached to a ring around the post inside the cylindrical-shaped guard and the other end of the tether being attached to the animal being restrained. As the animal moves around in the area of restraint, the guard will turn on the post and prevent the tether from becoming entangled.

Putnam U.S. Pat. No. 2,981,230 describes a tangle-free pet hitch which has a stake that is driven into the ground and which permits the tethered animal to have a full circular area for exercise. There is a vertical post that is driven into the ground, and it has a stabilizing member to prevent the post from being pulled loose. Near the top of the post is a fixed collar, and it supports a sleeve member that is rotatably and slidably mounted relative to the post and to the collar. The collar has a series of radially spaced holes for receiving a pair of stop bolts which are adjustably mounted which cooperate with an abutment on the collar to limit the rotary movement of the sleeve. The animal is fitted with a collar and chain that is attached to the free end of the rigid arm so that the animal is restricted so that it cannot run completely around the post because of the lost-motion stop means provided for limiting the rotary movement of the sleeve.

Holland U.S. Pat. No. 4,546,730 teaches what is alleged to be a tangle-free pet tether that is combined with an umbrella and a bowl to provide water or food for the restrained animal.

OBJECTS OF THE INVENTION

The principal object of the present invention is to provide an improved portable pet tether-feeding station combination with a tether that is tangle free.

A further object of the present invention is to provide an improved portable pet tether-feeding station combination that has multiple pins to anchor the device more securely to the ground.

SUMMARY OF THE INVENTION

The present invention provides a convenient, portable and inexpensive device for restraining a dog, cat or other animal within a defined area. The device has a relatively flat main body providing an endless circular groove that confines a wire or ring to rotating movement about the main body. The ring is attached to the animal's leash and allows the animal free movement within a circular area defined by the length of the leash. A plurality of removable pins anchor the device to the ground, with the pins being stored in storage grooves in the main body when not in use. The main body has a central recess that accommodates a bowl for food or water.

BRIEF DESCRIPTION OF THE DRAWINGS

This invention will be better understood from the following description taken in conjunction with the accompanying drawings in which.

DESCRIPTION OF THE PREFERRED EMBODIMENTS

Figure 1:
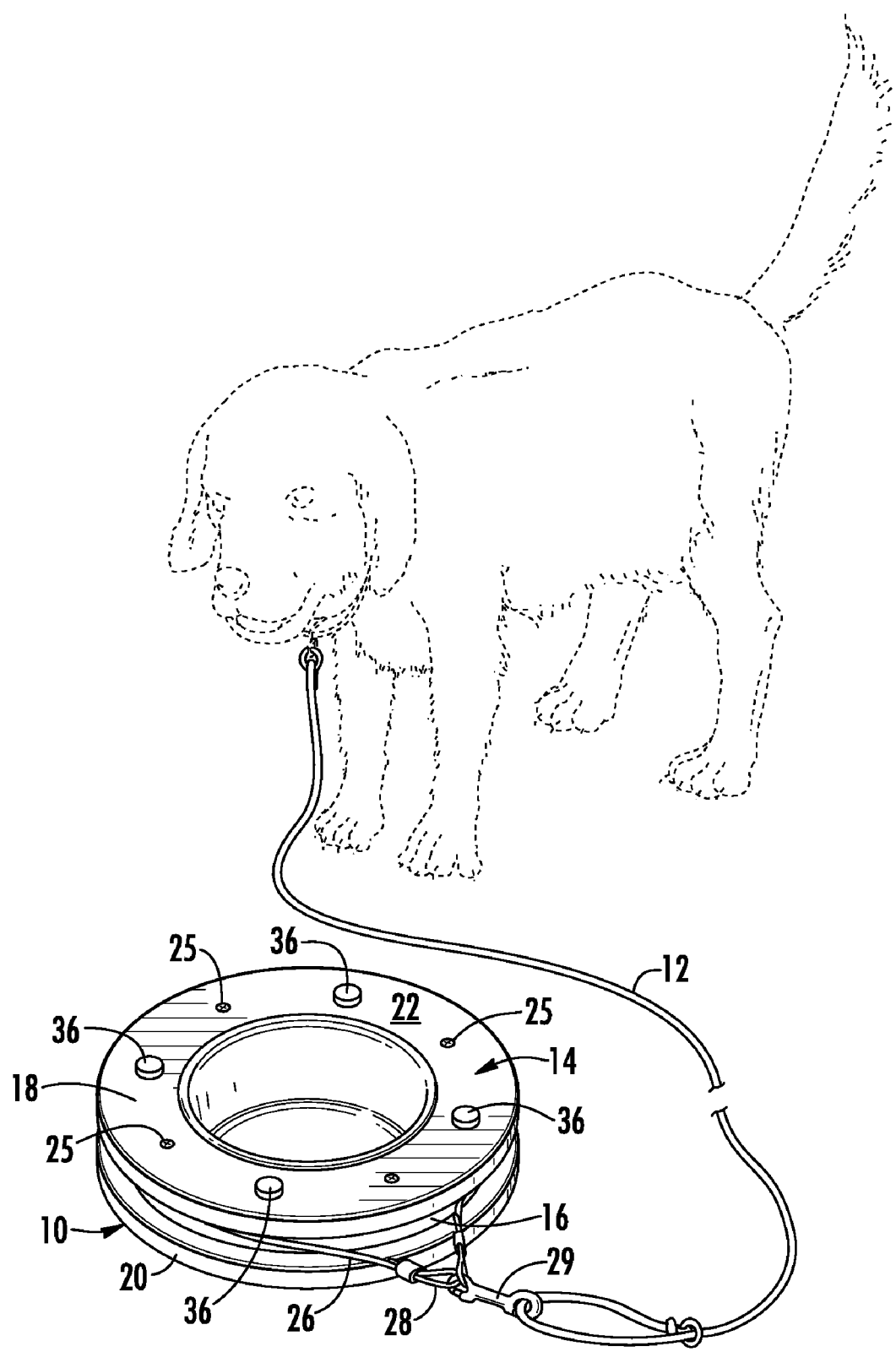
FIG. 1 is a perspective view of a pet tether-feeding station assembly embodying the principles of the invention.
Figure 2:
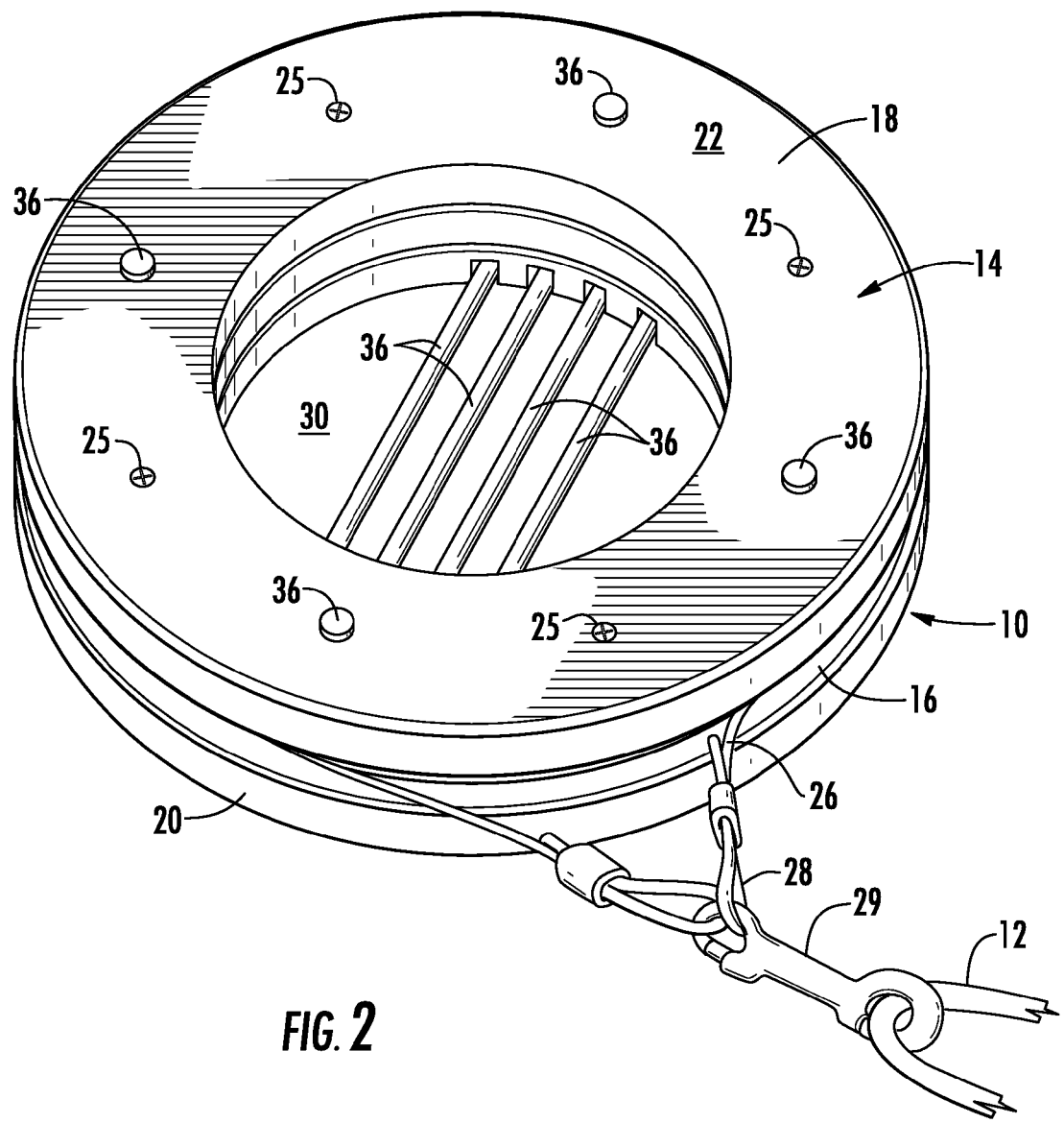
FIG. 2 is an enlarged top perspective view of the tether-feeding assembly of FIG. 1 with the feeding bowl removed.
Figure 3:
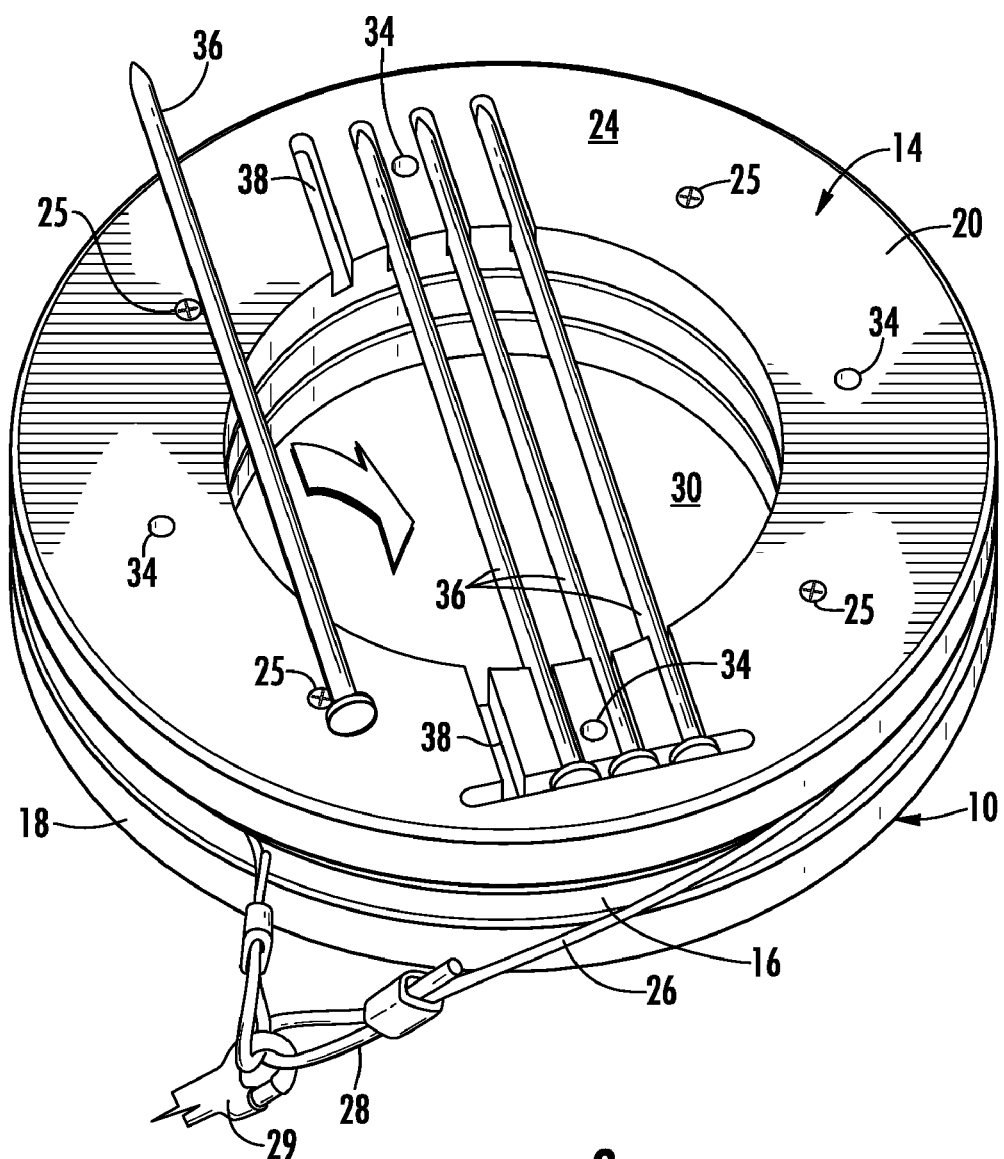
FIG. 3 is an enlarged bottom perspective view of the tether-feeding assembly of FIG. 1 with the feeding bowl removed.

Turning now to a consideration of the drawings, and in particular, to the perspective view of FIG. 1 there is shown an embodiment of the animal tether feeding station assembly 10 to which is attached a chain, leash, rope, tether or the like 12 the free end of which can be attached in any suitable well-known manner to the animal to be restrained. The assembly 10 has a doughnut-shaped main body 14 having an annular groove 16 extending around its periphery between a circular upper member 18 and a circular lower member 20. Members 18 and 20 are preferably of substantially the same diameter but could be of different diameters. Upper member 18 preferably has a flat top surface 22 and the lower member 20 has a flat bottom surface 24 (see FIG. 3) so that the assembly will be more stable when it is resting on the ground. If desired, the flat bottom surface 24 can be provided with a non-slip surface either formed in the surface or in a separate non-slip mat (not shown) affixed to surface 24t. This is especially desirable if the assembly is used indoors. The main body 14 is preferably formed of one piece (as illusrtated in FIG. 4C) by molding it from cement or plastic, casting it from metal or by any other suitable method. Of course, the main body 14 could be made of separate components fastened or adhered together in any suitable manner, such as by screws 25, as illustrated in FIGS. 1-3.

Figure 6:
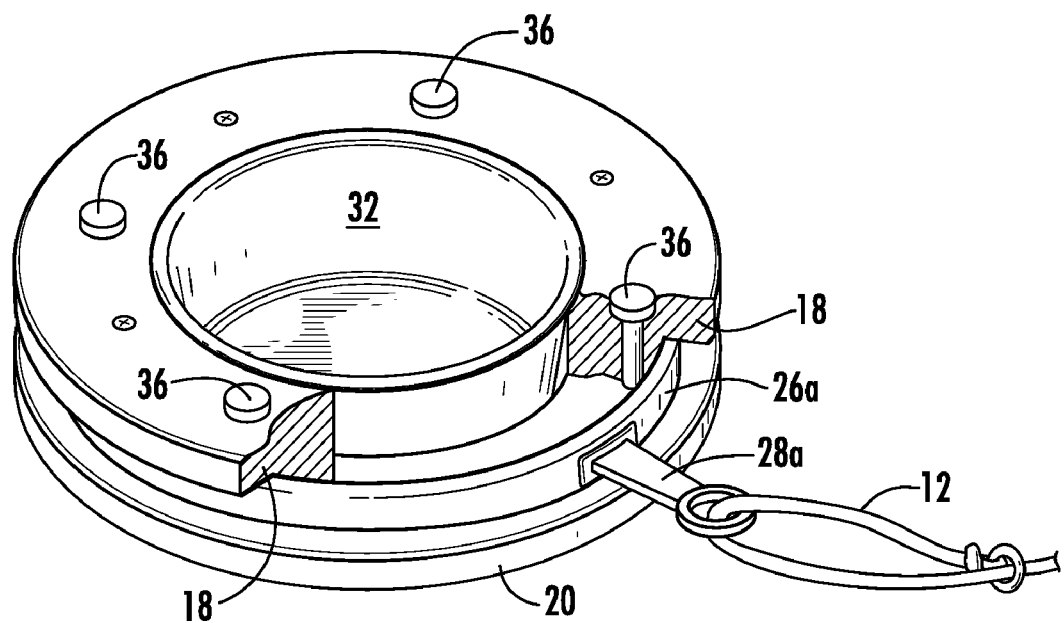
FIG. 6 is a perspective view similar to FIG. 5 but showing another embodiment of the invention.

Received in and freely engaged in the annular groove 16 is a flexible member 26, such as a cord, wire or the like, which has suitable fasteners 28 to provide for fastening the leash 12 which typically has a snap-fastener 29. The wire 26 is free to rotate around the assembly 10 in the groove 16, but the loop formed by the wire 26 is sufficiently small so that the wire 26 cannot slip out of the groove 16 when the fasteners 28 are attached to the leash 12. FIG. 6 show another embodiment of the invention in which an endless belt-like ring 26a having a fastener 28a is used in place of the wire 26. The ring 26a can be either rigid or somewhat flexible and has a diameter larger than the diameter of the annular groove 16 but less than the diameters of the upper and lower members 18 and 20. If the endless ring 26a is used, preferably the main body 14 is made of separate components to simplify assembly.

Figure 4A:
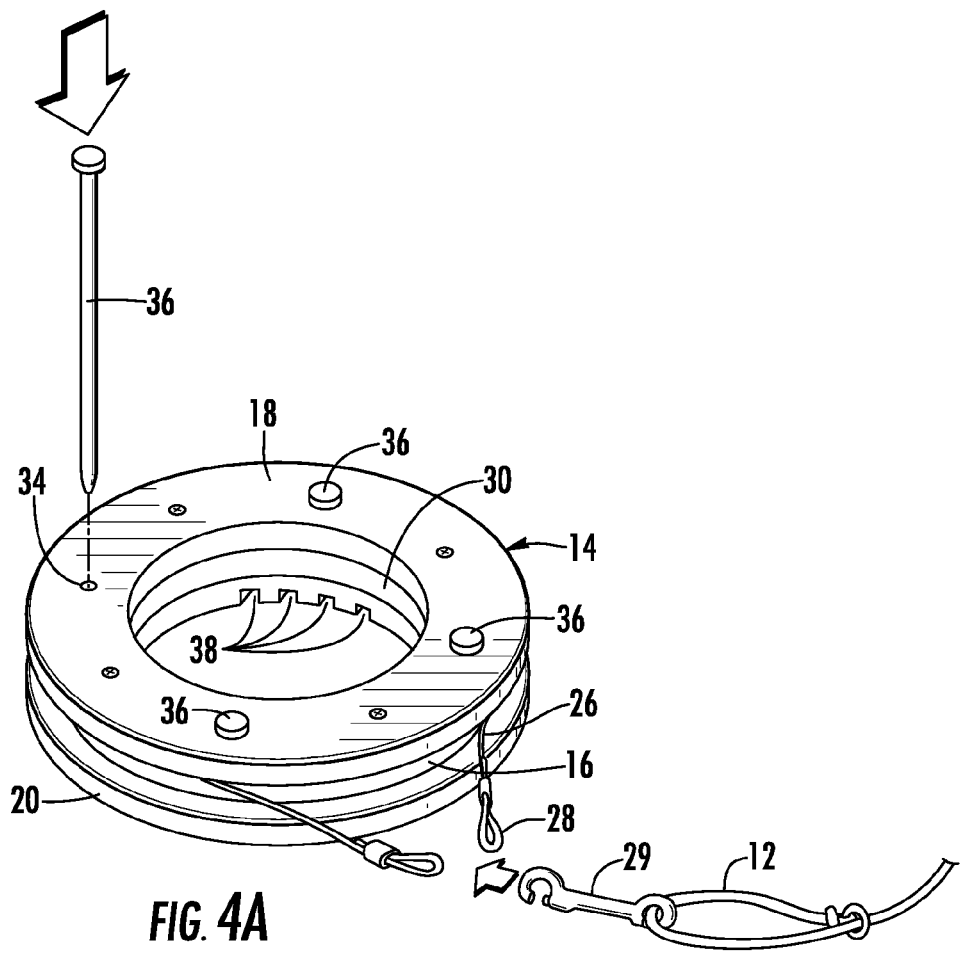
FIG. 4A is a view similar to FIG. 2 and illustrating insertion of the pins to hold the assembly in place.
Figure 4B:
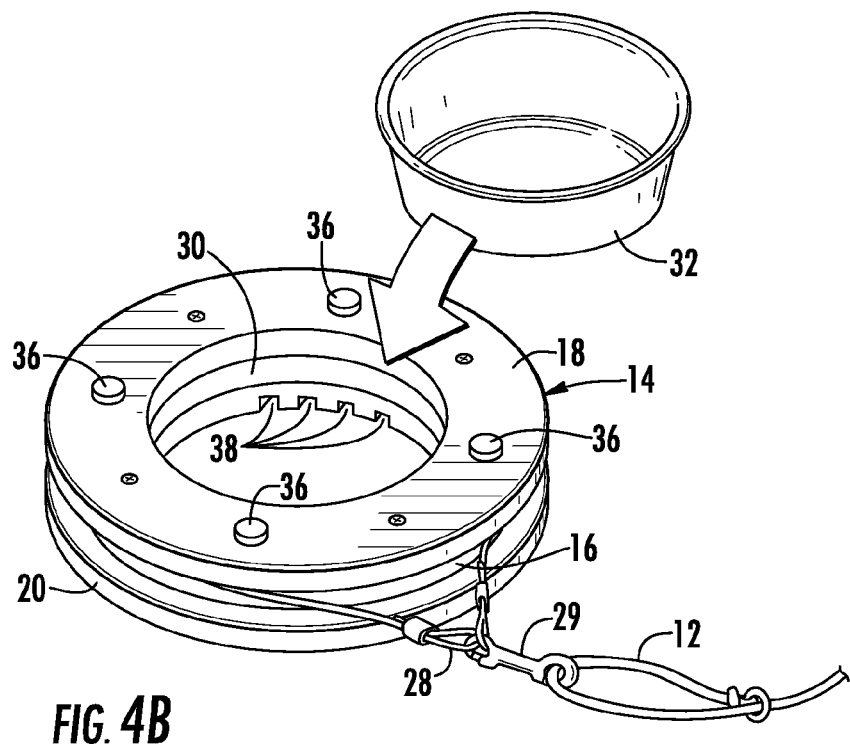
FIG. 4B is a view similar to FIG. 4A but showing the pins in place and the feeding bowl ready to be placed in the assembly.
Figure 4C:
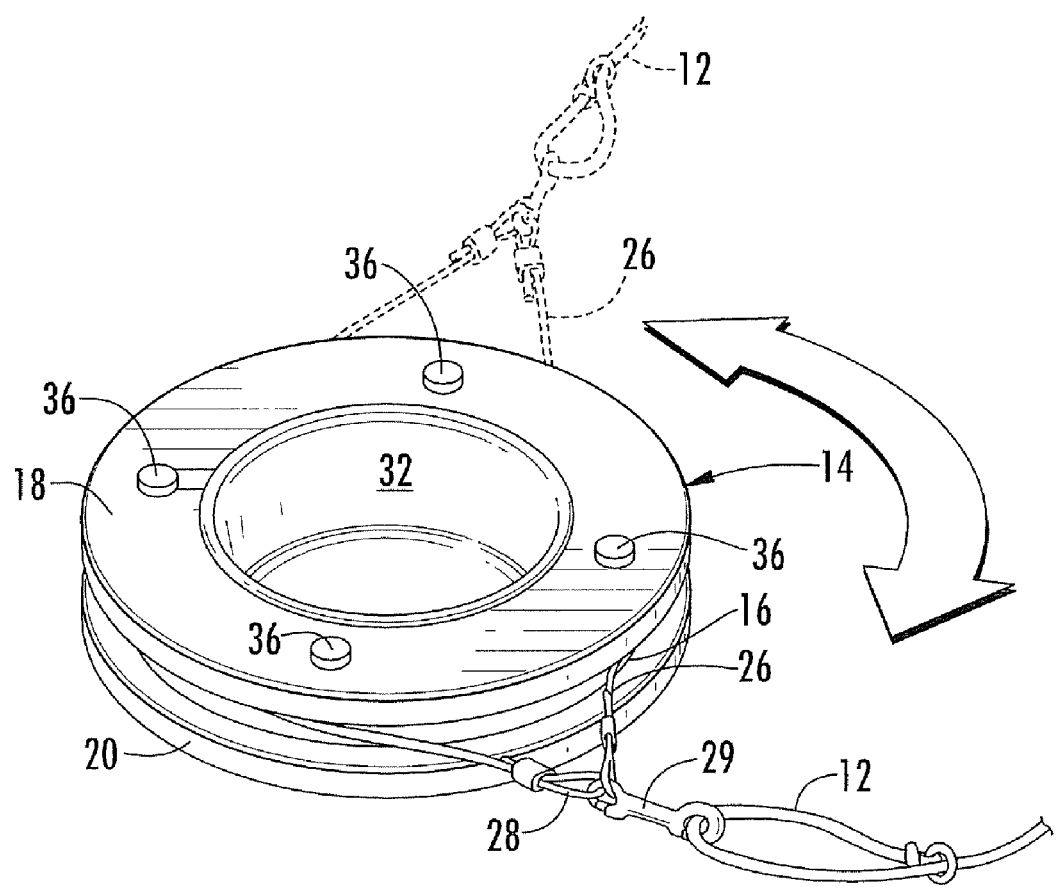
FIG. 4C is a view similar to FIG. 4B but showing the pins in place and the feeding bowl in place to complete the assembly.
Figure 5:
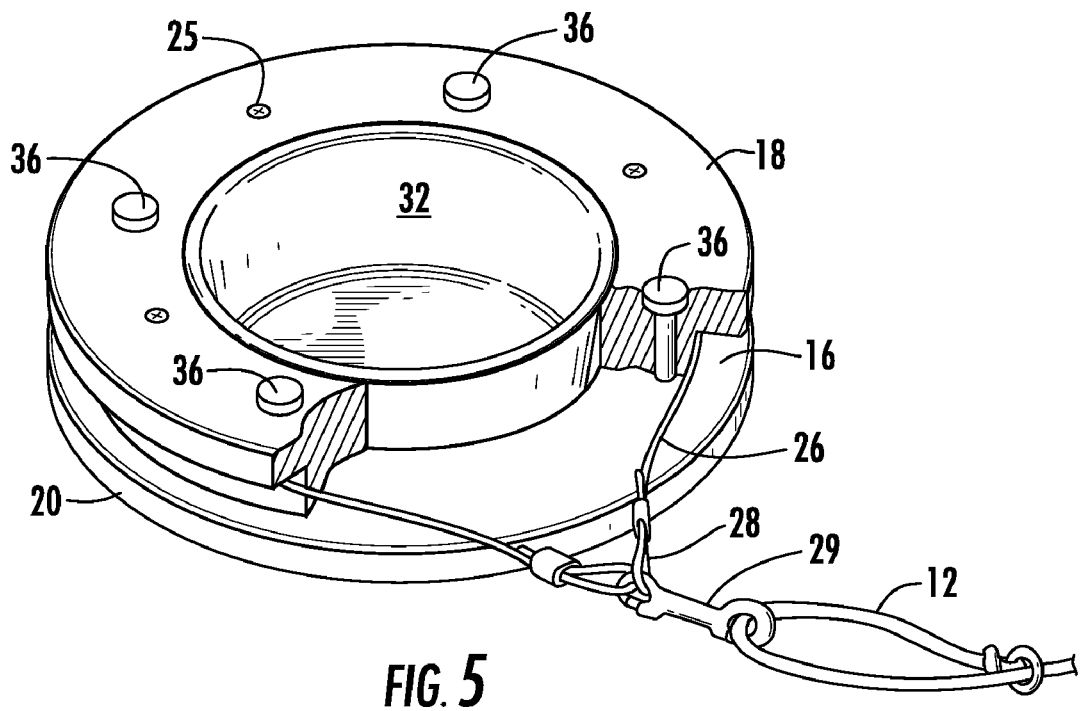
FIG. 5 is a view similar to FIG. 4C with portions of the assembly broken away to illustrate details of the assembly.

As best seen in FIGS. 4B and 4C, the circular opening formed by the ring-shaped members 18 and 20 provide a central recess 30 for the receipt of a removable bowl 32 into which food or water can be placed. If desired, the bowl 32 could be formed with separate compartments (not shown) so that one can be supplied with food while the other holds drinking water, for example. Also, it is conceivable that some people may prefer more than two separate compartments depending on the preference of the owner, and the bowl 32 can have dividers that form more than two compartments. It should be understood that the bowl 32 need not be circular and could also be formed as a part of the assembly and therefore not removable.

In order to anchor the pet tether-feeding station assembly 10 to the ground when used outdoors, the main body 14 has a plurality of spaced-apart openings 34 extending through the main body between the annular groove 16 and the central recess 30. Each openings 34 is adapted to receive a spike or pin 36 which should be of a length so as to extend into the ground a sufficient amount to secure the assembly 10. Since the force exerted by a tethered animal on the wire 26 or ring 26a will mostly have a radial component with a relatively small vertical or axially component, the assembly 10 will remain in place if it is properly secured to the ground. In situation where a large animal is being secured, longer pins 36 can be used that will extend 10" to 20" or more into the ground. Usually, the pins 36 need to extend only a few inches into the ground, and preferably, the pins 36 are of a length less than the diameter of the lower ring member 20. As best seen in FIGS. 2 and 3, if the pins 36 are of this lesser length, the bottom surface 24 of the ring member 20 can be formed with grooves 38 of a size to accommodate storage of the pins 36 in the grooves 38 when not in use so as to minimize the chance of the pins 36 becoming lost.

Although the main body 14 is illustrated in the drawings as being solid, the main body components could be made hollow with the main body 14 provided with a fill opening (not shown) closed by a removable cap (also not shown). This would allow the main body 14 to be filled with cold liquid on hot days or hot liquid on cold days to keep the contents of the bowl 32 at a desired temperature.

In the foregoing description, the animal leash 12 is illustrated as a separate item from the flexible member 26. This is because most pet owners have a leash and can therefore use the leash to connect the animal to the assembly of the invention by hooking the leash to the flexible member 26. However, it should be understood that the flexible member 26 and leash 12 could be a single, one piece item with the free end being connectible to the collar of the animal.

From the foregoing description of the embodiments of the invention, it will be evident that the animal tether feeding station assembly of the invention provides a simple device that can be used to tether and restrain animals, especially small dogs and cats. The device can be easily secured by pushing or driving the pins 36 into the ground. The pins 36 can be easily removed and stored in the storage grooves 38 so that the entire assembly can be moved to a new location. This makes the device of the invention especially suitable for pet owners who travel with their pets. The bowl 32 is removable for easy cleaning. The main body components can be made of a variety of different materials, such as cement or wood, or various metals or plastics. The material used will in part depend upon the method of manufacture and cost considerations.

Thus, the device of the invention provides a convenient, portable and inexpensive means for restraining a dog, cat or other animal within an area defined by the length of the leash 12. Many people own pets, and with leash laws now existing in most metropolitan areas, it may be too costly to fence-in a yard. Most pets enjoy being outside, especially when the weather is nice. The present invention provides an inexpensive means for allowing the pet to stay outside but restrained while at the same time having water and food available. The device also allows a restrained pet ample room to move and exercise without the danger of the pet becoming entangled by the restraining leash.

Having thus described the invention in connection with the preferred embodiments thereof, it will be evident to those skilled in the art, that various revisions can be made to the preferred embodiments as described herein, without departing from the spirit and scope of the invention. It is my intention, however, that all such revisions and modifications that are evident to those skilled in the art will be included within the scope of the following claims.

What is claimed is as follows:

1. A portable animal restraint assembly securable to the ground for confining an animal to a limited area by attaching the animal's leash to the assembly, said assembly comprising:
   a main body having a circular groove defining an endless wide circular path having an axis, the path being oriented generally in a horizontal plane when the assembly is in use to restrain an animal, said main body having a central recess;
   a member having a substantially annular shape positioned in and around the groove and freely movable in the groove about said axis in the defined circular path;
   the groove being adapted to confine the member to movement in the groove around the circular path;
   the main body providing a plurality of openings radially spaced apart around the central recess of the body which openings are located axially inwardly from the wide circular path;
   a plurality of pins removable received in said openings, the pins being sufficiently long so as to extend downwardly into the ground to anchor the assembly to the ground; and
   a fastener combined with the member to provide for connecting the member to the leash of the animal to be restrained whereby the animal will have free movement within a generally circular area around the assembly.

2. The assembly of claim 1 in which the main body is doughnut shaped.

3. The assembly of claim 2 in which a bowl is removably located in the recess, the bowl being adapted to receive food or water for the restrained animal.

4. The assembly of claim 3 in which the main body is provided with a plurality of storage grooves adapted to receive the pins when not used to secure the assembly to the ground.

5. The assembly of claim 1 in which the main body is a single piece.

6. The assembly of claim 1 in which the member is a substantially rigid member, and the fastener is adapted for connection to the animal's leash.

7. The assembly of claim 6 in which the main body is formed of more than one piece to provide for assembling the rigid member to the main body.

8. The assembly of claim 1 in which the member is flexible and the fastener is adapted for connection to the animal's leash.

\* \* \* \* \*